US012802711B2

(12) United States Patent
Han et al.

(10) Patent No.: US 12,802,711 B2
(45) Date of Patent: Nov. 17, 2026

(54) METHOD, APPARATUS, AND PROGRAM FOR IMPROVING RECOGNITION ACCURACY OF ACOUSTIC DATA

(71) Applicant: COCHL INC, Dover, DE (US)

(72) Inventors: Yoonchang Han, Seoul (KR); Jeongsoo Park, Suwon-si (KR); Subin Lee, Seoul (KR); Ilyoung Jeong, Seoul (KR); Hyungui Lim, Seoul (KR); Donmoon Lee, Suwon-si (KR)

(73) Assignee: COCHL INC, Dover, DE (US)

( * ) Notice: Subject to any disclaimer, the term of this patent is extended or adjusted under 35 U.S.C. 154(b) by 234 days.

(21) Appl. No.: 18/711,933

(22) PCT Filed: Nov. 11, 2022

(86) PCT No.: PCT/KR2022/017701
§ 371 (c)(1),
(2) Date: May 21, 2024

(87) PCT Pub. No.: WO2023/090760
PCT Pub. Date: May 25, 2023

(65) Prior Publication Data
US 2025/0029631 A1 Jan. 23, 2025

(30) Foreign Application Priority Data
Nov. 22, 2021 (KR) ........................ 10-2021-0161205

(51) Int. Cl.
*G10L 25/51* (2013.01)

(52) U.S. Cl.
CPC .................................... *G10L 25/51* (2013.01)

(58) Field of Classification Search
CPC ........ G06F 3/162; G06F 16/683; G06F 16/68; G06F 17/00
(Continued)

(56) References Cited

U.S. PATENT DOCUMENTS

2024/0177720 A1* 5/2024 Markovic ............... G10L 19/02
2024/0321285 A1* 9/2024 Vaillancourt ........... G10L 19/12

FOREIGN PATENT DOCUMENTS

JP 2019-139010 A 8/2019
KR 10-2006-0064554 A 6/2006
(Continued)

OTHER PUBLICATIONS

Lim et al.; "Convolutional Neural Network based Audio Event Classification"; KSII Transactions on Internet and Information Systems (TIIS); vol. 12, No. 6; Jun. 30, 2018; pp. 2748-2760.
(Continued)

*Primary Examiner* — Alexander Krzystan
(74) *Attorney, Agent, or Firm* — Studebaker Brackett PLLC

(57) ABSTRACT

In an embodiment of the present invention for solving the above-described problem, a method of improving recognition accuracy of acoustic data is disclosed. The method may include configuring one or more acoustic frames based on acoustic data, processing each of the one or more acoustic frames as an input of an acoustic recognition model to output predicted values corresponding to each acoustic frame, identifying one or more recognized acoustic frames through threshold analysis based on the predicted values corresponding to each acoustic frame, identifying a converted acoustic frame through time series analysis based on the one or more recognized acoustic frames, and converting a predicted value corresponding to the converted acoustic frame.

7 Claims, 9 Drawing Sheets

(58) Field of Classification Search
USPC .......................................................... 700/94
See application file for complete search history.

(56) References Cited

FOREIGN PATENT DOCUMENTS

| | | | |
|---|---|---|---|
| KR | 10-2017-0137217 | A | 12/2017 |
| KR | 10-2020-0119414 | A | 10/2020 |

OTHER PUBLICATIONS

Greco et al.; "DENet: a deep architecture for audio surveillance applications"; Neural Computing and Applications; vol. 33; Jan. 11, 2021; pp. 11273-11284.
International Search Report issued in PCT/KR2022/017701; mailed Feb. 24, 2023.
An Office Action; "Notice of Reasons for Refusal," mailed by the Japanese Patent Office on May 12, 2025, which corresponds to Japanese Patent Application No. 2024-526923 and is related to U.S. Appl. No. 18/711,933.

* cited by examiner

FIG. 8

| | 0 TO 1 SECOND | 0.5 TO 1.5 SECONDS | 1 TO 2 SECONDS | 1.5 TO 2.5 SECONDS | 2 TO 3 SECONDS |
|---|---|---|---|---|---|
| Siren | 0.1 | 0.9 | 0.8 | 0.7 | 0.2 |
| Scream | 0.8 | 0.0 | 0.1 | 0.3 | 0.0 |
| Glass break | 0.0 | 0.0 | 0.0 | 0.0 | 0.8 |
| Others | 0.1 | 0.1 | 0.1 | 0.0 | 0.0 |

METHOD, APPARATUS, AND PROGRAM FOR IMPROVING RECOGNITION ACCURACY OF ACOUSTIC DATA

CROSS-REFERENCE TO RELATED APPLICATIONS

This application is a national stage entry of International Application No. PCT/KR2022/017701 filed Nov. 11, 2022, which claims benefit of priority to Korean Patent Application No. 10-2021-0161205 filed Nov. 22, 2021, the entire content of which is incorporated herein by reference.

BACKGROUND

1. Technical Field

The present invention relates to a method of improving a recognition rate of acoustic data, and more particularly, to a technology for improving a recognition rate through post-processing correction for acoustic data.

2. Related Art

Since it is difficult for hearing-impaired people who cannot hear sounds completely or distinguish sounds well to judge situations by hearing sounds, not only are there many difficulties in daily life, but it is also impossible to recognize dangerous situations in indoor and outdoor environments using sound information, and thus immediate response is impossible. In situations where auditory sense is impaired or limited, such as pedestrians wearing earphones and the elderly as well as the hearing-impaired people, acoustics occurring around users can be blocked. Additionally, in situations where it is difficult to detect acoustics, such as when users are sleeping, the users are at risk of being in dangerous situations or having accidents because they are not aware of their surrounding situations.

Meanwhile, the need to develop a technology for detecting and recognizing acoustic events in this environment is emerging. The technology for detecting and recognizing the acoustic events is continuously being researched as a technology that can be applied to various fields such as real-life environment context recognition, risk situation recognition, media content recognition, and situation analysis in wired communication.

The acoustic event recognition technology mainly includes researches for verifying excellent features by extracting various feature values such as a mel-frequency cepstral coefficient (MFCC), energy, a spectral flux, and a zero crossing rate from audio signals, researches on Gaussian mixture model, rule-based classification methods, etc. In recent years, deep learning-based machine learning methods are being studied to improve the above methods. However, these methods have limitations in that the accuracy of acoustic detection is ensured at a low signal-to-noise ratio, and it is difficult to distinguish between ambient noise and incident acoustics.

In other words, it may be difficult to detect acoustic events with high reliability in real-life environments including various surrounding noises. Specifically, in order to detect valid acoustic events, it is necessary to determine whether the acoustic events have occurred in acoustic data acquired in time series (i.e., continuously) and it is also necessary to recognize which event class has occurred, thereby making it difficult to secure the high reliability. In addition, when two or more events occur simultaneously, since the problem of recognizing multiple events (polyphonic) rather than a single event (monophonic) should be solved, the recognition rate of the acoustic events can be lowered.

In addition, the reason for the low recognition rate when detecting the acoustic events in acoustic data acquired in real life is that the probability of determining that the events exist even when the acoustic events have not occurred or determining that the events do not exist even when the events have occurred, that is, the probability of false alarm exists.

Therefore, when an error alarm probability is reduced in response to acoustic data acquired in time series, acoustic event detection with improved reliability in a real-life environment can be possible.

RELATED ART DOCUMENT

Patent Document

Korean Patent No. 10-2014-0143069

SUMMARY

The present invention provides an acoustic data recognition environment with improved accuracy through post-processing correction related to acoustic data.

Objects of the present invention are not limited to the above-described objects. That is, other objects that are not described may be obviously understood by those skilled in the art from the following description.

According to various embodiments of the present invention for solving the above-described problem, a method of improving recognition accuracy of acoustic data is disclosed. The method may include configuring one or more acoustic frames based on acoustic data, processing each of the one or more acoustic frames as an input of an acoustic recognition model to output predicted values corresponding to each acoustic frame, identifying one or more recognized acoustic frames through threshold analysis based on the predicted values corresponding to each acoustic frame, identifying a converted acoustic frame through time series analysis based on the one or more recognized acoustic frames, and converting a predicted value corresponding to the converted acoustic frame.

The configuring of the one or more acoustic frames based on the acoustic data may include configuring the one or more acoustic frames by dividing the acoustic data to have a size of a preset first time unit.

A start time of each of the one or more acoustic frames may be determined to have a size difference of a second time unit from a start time of each of adjacent acoustic frames.

The predicted value may include one or more pieces of prediction item information and predicted numerical information corresponding to each of the one or more pieces of prediction item information, and the threshold analysis may be an analysis that identifies the one or more recognized acoustic frames by determining whether each of the one or more pieces of predicted numerical information corresponding to each of the acoustic frames is greater than or equal to a predetermined threshold value in response to each of the prediction item information.

The identifying of the converted acoustic frame through the time series analysis may include identifying prediction item information corresponding to each of the one or more recognized acoustic frames, determining whether the identified prediction item information is repeated a predetermined threshold number of times or more for a predetermined reference time, and identifying the converted acoustic frame based on the determination result.

The method may further include identifying a correlation between each recognized acoustic frame based on the prediction item information corresponding to each of one or more recognized acoustic frames, and determining whether to adjust the threshold values and the threshold number of times corresponding to each of the one or more acoustic frames based on the correlation.

The conversion for the predicted value may include at least one of a noise conversion that converts an output of the acoustic recognition model based on the converted acoustic frame into a non-recognition item, and an acoustic item conversion that converts prediction item information related to the converted acoustic frame into corrected prediction item information.

The corrected prediction item information may be determined based on a correlation between the prediction item information.

According to another embodiment of the present invention, an apparatus for performing a method of improving recognition accuracy of acoustic data is disclosed. The apparatus includes a memory configured to store one or more instructions, and a processor configured to execute the one or more instructions stored in the memory, in which the processor performs the one or more instructions to perform the above-described method of improving recognition accuracy of acoustic data.

According to still another embodiment of the present invention, a computer-readable recording medium. The computer-readable recording medium may improve recognition accuracy of acoustic data method in combination with a computer which is hardware.

Other specific details of the present invention are included in the detailed description and drawings.

BRIEF DESCRIPTION OF DRAWINGS

FIG. 8 is an exemplary table for describing a process of correcting acoustic data correction process according to an embodiment of the present invention.

DESCRIPTION OF EXAMPLE EMBODIMENTS

Figure 1:
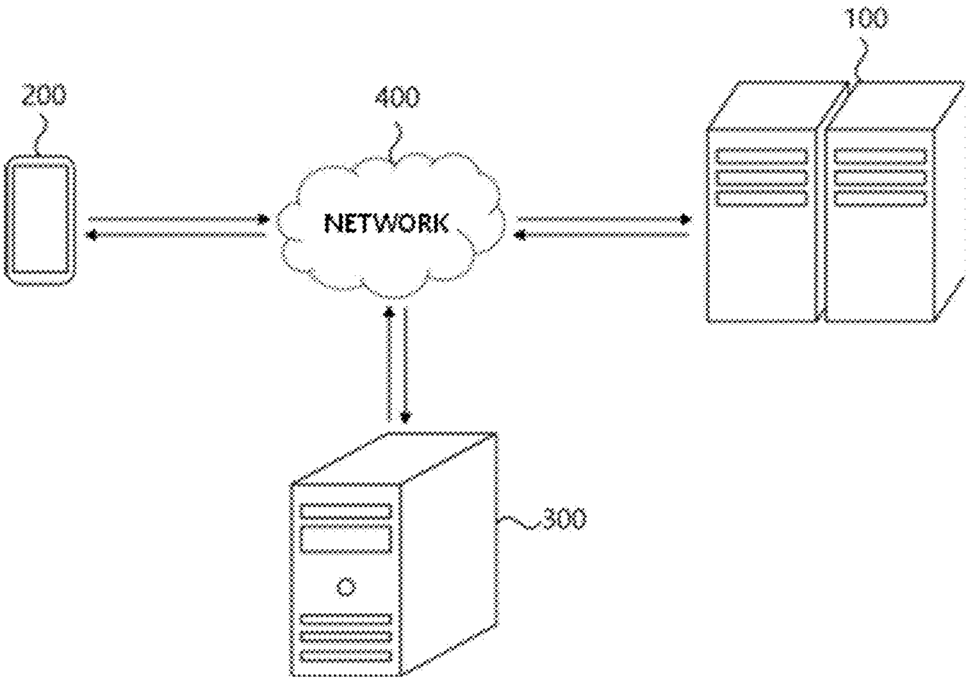
FIG. 1 is a schematic diagram illustrating a system for performing a method of improving recognition accuracy of acoustic data according to an embodiment of the present invention.

Hereinafter, various embodiments will be described with reference to the accompanying drawings. In this specification, various descriptions are presented to provide an understanding of the present invention. However, it is obvious that these embodiments may be practiced without these specific descriptions.

Terms used herein "component," "module," "system," etc., refer to a computer-related entity, hardware, firmware, software, a combination of software and hardware, or an implementation of software. For example, a component may be, but is not limited to, a procedure running on a processor, a processor, an object, an execution thread, a program, and/or a computer. For example, an application running on a computing device and the computing device may each be a component. One or more components may reside within a processor and/or execution thread. One component may be localized within one computer. One component may be distributed between two or more computers. In addition, these components may be executed from various computer-readable media having various data structures stored therein. Components may communicate via local and/or remote processes (e.g., data from one component interacting with other components in a local system and a distributed system and/or data transmitted to other systems via networks such as the Internet according signals), for example according to signals with one or more data packets.

In addition, the term "or" is intended to mean an inclusive "or," not an exclusive "or." That is, unless otherwise specified or clear from context, "X uses A or B" is intended to mean one of the natural implicit substitutions. That is, when either X uses A; X uses B; or X uses both A and B, "X uses A or B" may apply to either of these cases. In addition, the term "and/or" used herein should be understood to refer to and include all possible combinations of one or more of the related items listed.

In addition, the terms "include" and/or "including" should be understood to mean that the corresponding feature and/or component is present. However, the terms "include" and/or "including" should be understood as not excluding the presence or addition of one or more other features, components and/or groups thereof. In addition, unless otherwise specified or the context is clear to indicate a singular form, the singular form in the present specification and in the claims should generally be construed to mean "one or more."

In addition, those skilled in the art should recognize that various illustrative logical blocks, configurations, modules, circuits, means, logic, algorithms, and steps described in connection with the embodiments disclosed herein may be implemented by electronic hardware, computer software, or a combination of both. To clearly illustrate interchangeability of hardware and software, various illustrative components, blocks, configurations, means, logics, modules, circuits, and steps have been described above generally in terms of their functionality. Whether such functionality is implemented by hardware or software will depend on the specific application and design constraints imposed on the overall system. Those skilled in the art may implement the described functionality in a variety of ways for each specific application. However, such implementation determinations should not be construed as departing from the scope of the present invention.

The description of the presented embodiments is provided to enable those skilled in the art to make or use the present invention. Various modifications to these embodiments will be apparent to those skilled in the art. The general principles defined herein may be applied to other embodiments without departing from the scope of the present invention. Therefore, the present invention is not limited to the embodiments presented herein. The present invention should be interpreted in the broadest scope consistent with the principles and novel features presented herein.

In this specification, a computer means any kind of hardware device including at least one processor, and can be understood as including a software configuration which is operated in the corresponding hardware device according to the embodiment. For example, the computer may be understood as a meaning including any of smart phones, tablet PCs, desktops, laptop computers, and user clients and applications running on each device, but is not limited thereto.

Hereinafter, embodiments of the present invention will be described in detail with reference to the accompanying drawings.

Each step described in this specification is described as being performed by the computer, but subjects of each step are not limited thereto, and according to embodiments, at least a part of each step can also be performed on different devices.

Here, a method of improving recognition accuracy of acoustic data according to various embodiments of the present invention may relate to a method of correcting acoustic data to improve a recognition rate of acoustic data. Correction for acoustic data may refer to, for example, post-processing correction related to the acoustic data. That is, when acquiring time series acoustic data, the present invention may improve accuracy in a process of recognizing acoustic data by performing post-processing correction on the corresponding acoustic data. In an embodiment, improvement in recognition accuracy of acoustic data may mean that recognition accuracy of detecting a specific event in the acoustic data is improved.

Meanwhile, in order to detect or recognize a specific event in acoustic data with high accuracy, it may be important to reduce an error alarm probability. Here, the error detection probability may be related to the probability of determining that an event exists even when an acoustic event has not occurred or determining that an event does not exist even when an event has occurred.

According to an embodiment, the method of improving recognition accuracy of acoustic data may divide the acoustic data into a plurality of acoustic frames with a certain time unit and perform acoustic recognition corresponding to each of the divided acoustic frames in order to minimize the error alarm probability of the acoustic data, thereby improving the accuracy of the acoustic data recognition. In this case, each acoustic frame may have at least some overlapping sections with other acoustic frames. That is, the present invention may subdivide the acoustic data, which is time series information, into a certain time unit to form a plurality of acoustic frames, and perform analysis on each acoustic frame. As a result of the analysis, it is possible to perform conversion on at least some of the plurality of acoustic frames. For example, only when a specific acoustic (e.g., siren sound) is recognized across at least two of the plurality of acoustic frames, it may be determined that the specific acoustic has been recognized. In other words, when the specific acoustic (e.g., siren sound) is recognized only in the specific acoustic frame among the plurality of acoustic frames (i.e., when the specific acoustic is not recognized in an acoustic frame adjacent to the specific acoustic frame), by determining that the specific acoustic is not recognized, the conversion related to the corresponding acoustic frame may be performed. Here, the conversion related to the acoustic frame may refer to converting the corresponding acoustic into unrecognized acoustic or converting the corresponding acoustic into different acoustic (e.g., acoustic not involved in recognition), since, for example, acoustic (e.g., siren sound) recognized in relation to the specific acoustic frame is misrecognized acoustic. In other words, sounds recognized only in one frame may be determined to be errors and removed, and sounds recognized continuously in relation to frames may be determined to be recognized normally.

In summary, according to the present invention, the acoustic data may be subdivided in units of frames, and sounds that are not continuously recognized in relation to each frame may be determined to be misrecognized sounds and thus subjected to pro-processing correction, thereby improving the recognition accuracy of the entire acoustic data. A more detailed description of the method of improving recognition accuracy of acoustic data will be described in detail below.

FIG. 1 is a schematic diagram illustrating a system for performing a method of improving recognition accuracy of acoustic data according to an embodiment of the present invention. As illustrated in FIG. 1, a system for performing a method of improving recognition accuracy of acoustic data according to the embodiment of the present invention may include a server 100 for improving recognition accuracy of acoustic data, a user terminal 200, and an external server 300. Here, the system for performing the method of improving recognition accuracy of acoustic data illustrated in FIG. 1 is according to an embodiment, and its components are not limited to the embodiment illustrated in FIG. 1, and some components may be added, changed, or deleted if necessary.

In an embodiment, the server 100 for improving recognition accuracy of acoustic data may determine whether a specific event has occurred based on the acoustic data. Specifically, the server 100 for improving recognition accuracy of acoustic data may acquire acoustic data related to real life and determine whether a specific event has occurred through analysis of the acquired acoustic data. In an embodiment, the specific event may be related to security, safety, or risk occurrence, and to, for example, the occurrence of alarm sound, child crying sound, glass breaking sound, or flat tire sound. The detailed description of the acoustic related to the specific event described above is only exemplary, and the present invention is not limited thereto.

According to an embodiment, since the acoustic data acquired in real life includes various surrounding noises, it may be difficult to detect acoustic events with high reliability. Accordingly, when receiving the acoustic data, the server 100 for improving the recognition accuracy of acoustic data of the present invention may perform post-processing correction on the corresponding acoustic data. Here, the post-processing correction may refer to correction to reduce the error alarm probability during the process of recognizing acoustic data. For example, the post-processing correction may include converting recognized sounds (e.g., glass breaking sound) into unrecognized sounds (i.e., treated as noise) in some sections of acoustic data or converting the recognized acoustic result into another acoustic. In other words, the server 100 for improving recognition accuracy of acoustic data may acquire time series acoustic data related to real life and secure improved recognition accuracy through the post-processing correction on the acquired acoustic data.

According to an embodiment, the server 100 for improving recognition accuracy of acoustic data may include any server implemented by an application programming interface (API). For example, the user terminal 200 may acquire the acoustic data and transmit the acquired acoustic data to the server 100 through the API. For example, the server 100 may acquire the acoustic data from the user terminal 200 and determine that an emergency alarm sound (e.g., siren sound) has occurred through the analysis of the acoustic data. In an embodiment, the server 100 for improving recognition accuracy of acoustic data may perform analysis on acoustic data through an acoustic recognition model (e.g., artificial intelligence model).

In an embodiment, the acoustic recognition model (e.g., artificial intelligence model) includes one or more network functions, and one or more network functions may include a set of interconnected computational units, which may generally be referred to as "node." These "nodes" may also be referred to as "neurons." One or more network functions include one or more nodes. Nodes (or neurons) that constitute one or more network functions may be interconnected by one or more "links."

Within the artificial intelligence model, one or more nodes connected through the link may form a relative relationship between an input node and an output node. The concepts of the input node and the output node are relative, and any node in the relationship of the output node with respect to one node may be in the input node relationship with respect to the relationship with another node, and vice versa. As described above, the relationship between the input node and the output node may be generated based on the link. One or more output nodes may be connected to one input node through the link, and vice versa.

In the relationship between the input node and the output node connected through one link, a value of the output node may be determined based on data input to the input node. Here, the node connecting the input node and the output node may have weights. The weights may be variable, and may vary by a user or algorithm in order for the artificial intelligence model to perform the desired functions. For example, when one or more input nodes are connected to one output node by the respective links, the value of the output node may be determined based on the values input to the input nodes connected to the output node and the weights set on the links corresponding to the respective input nodes.

As described above, the artificial intelligence model interconnects one or more nodes through one or more links to form the relationship between the input node and the output node within the artificial intelligence model. The characteristics of the artificial intelligence model may be determined according to the number of nodes and links within the artificial intelligence model, the correlation between nodes and links, and the weight value assigned to each link. For example, when there are two artificial intelligence models with the same number of nodes and links and different weight values between the links, the two artificial intelligence models may be recognized to be different from each other.

Some of the nodes constituting the artificial intelligence model may constitute one layer based on distances from an initial input node. For example, a set of nodes with a distance n from the initial input node may constitute n layers. The distance from the initial input node may be defined by the minimum number of links that should be passed to reach the corresponding node from the initial input node. However, this definition of the layer is arbitrary for explanation purposes, and the order of the layer within the artificial intelligence model may be defined in a different way than described above. For example, the layer of the nodes may be defined by a distance from a final output node.

The initial input nodes may refer to one or more nodes, to which data is directly input without going through links in relationships with other nodes, among the nodes in the artificial intelligence model. Alternatively, the initial input nodes may refer to nodes that do not have other input nodes connected by the link in the relationship between the nodes based on the link within the artificial intelligence model network. Similarly, the final output nodes may refer to one or more nodes that do not have the output node in the relationship with other nodes among the nodes in the artificial intelligence model. In addition, hidden nodes may refer to nodes that constitute the artificial intelligence model rather than the first input node and the last output node. The artificial intelligence model according to the embodiment of the present invention may have more nodes of the input layer than the nodes of the hidden layer close to an output layer, and may be the artificial intelligence model in which the number of nodes decreases as it progresses from the input layer to the hidden layer.

The artificial intelligence model may include one or more hidden layers. The hidden node of the hidden layer may use an output of a previous layer and an output of surrounding hidden nodes as inputs. The number of hidden nodes for each hidden layer may be the same or different. The number of nodes of the input layer may be determined based on the number of data fields of the input data and may be the same as or different from the number of hidden nodes. The input data input to the input layer may be calculated by the hidden node of the hidden layer and output by a fully connected layer (FCL) which is the output layer.

In various embodiments, an artificial intelligence model may be subjected to supervised learning using a plurality of acoustic data and feature information corresponding to each piece of acoustic data as training data. However, the present embodiment is not limited thereto, and various learning methods may be applied.

Here, the supervised learning is generally a method of labeling specific data and information related to the specific data to generate training data and performing training using the generated training data, and refers to a method of labeling two data with a causal relationship to generate training data and performing training through the generated training data.

In an embodiment, the server 100 for improving recognition accuracy of acoustic data may determine whether to stop training using verification data when training of one or more network functions is performed more than or equal to a predetermined epoch. The predetermined epoch may be a part of the entire training target epoch.

The verification data may include at least some of the labeled training data. That is, the server 100 for improving recognition accuracy of acoustic data performs the training of the artificial intelligence model through the training data, and after the training of the artificial intelligence model is repeated more than or equal to the predetermined epoch, the server 100 may use the verification data to determine whether the training effect of the artificial intelligence model is the predetermined level or more. For example, the server 100 for improving recognition accuracy of acoustic data may perform the predetermined epoch, i.e., 10-time repetitive training, and then perform 3-time repetitive training using 10 pieces of verification data when performing the training, in which the target number of times of repetitive training is 10 times, using 100 pieces of training data, and may determine that further training is meaningless when a change in output of the artificial intelligence model during the 3-time repetitive training is a predetermined level or less and may terminate the training.

In other words, the verification data may be used to determine the completion of training based on whether the effect of training for each epoch is a certain level or more or a certain level or less in the repetitive training of the artificial intelligence model. The above-described training data, the number of verification data, and the number of times of repetitions are only exemplary and the present invention is not limited thereto.

The server 100 for improving recognition accuracy of acoustic data may test performance of one or more network functions using test data to determine whether to activate one or more network functions, thereby generating the artificial intelligence model. The test data may be used to verify the performance of the artificial intelligence model and include at least some of the training data. For example, 70% of the training data may be used to train the artificial intelligence model (i.e., training for adjusting weights to output result values similar to the label), and 30% of the training data may be used to verify the performance of the artificial intelligence model. The server 100 for improving recognition accuracy of acoustic data may input the test data to the trained artificial intelligence model, measure errors, and determine whether to activate the artificial intelligence model depending on whether the performance is the predetermined performance or more.

The server 100 for improving recognition accuracy of acoustic data may verify the performance of the trained artificial intelligence model using the test data on the trained artificial intelligence model, and may be activated to use the corresponding artificial intelligence model in other applications when the performance of the trained artificial intelligence model is a predetermined reference or more.

In addition, the server 100 for improving recognition accuracy of acoustic data may deactivate and discard the corresponding artificial intelligence model when the trained artificial intelligence model is the predetermined reference or less. For example, the server 100 for improving recognition accuracy of acoustic data may determine the performance of the artificial intelligence model generated based on factors such as accuracy, precision, and recall. The above-described performance evaluation reference is only exemplary and the present invention is not limited thereto. The server 100 for improving recognition accuracy of acoustic data may independently train each artificial intelligence model to generate a plurality of artificial intelligence models, and evaluate the performance to use only the artificial intelligence model with a certain performance or more. However, the present invention is not limited thereto.

Throughout this specification, a computational, a neural network, and a network function may be used as the same meaning. (Hereinafter, these terms are unified as the neural network.) A data structure may include the neural network. The data structure including the neural network may be stored in a computer-readable medium. The data structure including the neural network may also include data input to the neural network, weights of the neural network, hyperparameters of the neural network, data acquired from the neural network, activation functions associated with each node or layer of the neural network, and loss functions for training the neural network. The data structure including the neural network may include any of the components disclosed above. The data structure including the neural network may include the data input to the neural network, the weights of the neural network, the hyperparameters of the neural network, the data acquired from the neural network, the activation functions associated with each node or layer of the neural network, the loss functions for training the neural network, and any combination thereof. In addition to the configurations described above, the data structure including the neural network may include any other information that determines the characteristics of the neural network. In addition, the data structure may include all types of data used or generated in the computational process of the neural network and is not limited to the above. The computer-readable media may include computer-readable recording media and/or computer-readable transmission media. The neural network may generally include a set of interconnected computational units, which may be referred to as nodes. These "nodes" may also be referred to as "neurons." The neural network includes at least one node.

According to an embodiment of the present invention, the server 100 for improving recognition accuracy of acoustic data may be a server that provides a cloud computing service. More specifically, the server 100 for improving recognition accuracy of acoustic data is a type of Internet-based computing and may be a server that provides the cloud computing service that processes information not with the user's computer but with another computer connected to the Internet. The cloud computing services may be services that may store data through the Internet and allow users to use necessary data or programs anytime, anywhere through Internet access without having to install the necessary data or programs on their computers, and allow the users to easily share and deliver data stored through the Internet with simple operations and clicks. In addition, the cloud computing services may be services that may not only simply store data in a server through the Internet, but may also perform desired tasks using functions of application programs provided on a web without having to install a separate program, and allow multiple people to perform tasks while sharing documents at the same time. In addition, the cloud computing services may be implemented in one or more of the following forms: Infrastructure as a Service (IaaS), Platform as a Service (PaaS), Software as a Service (SaaS), a virtual machine-based cloud server, and a container-based cloud server. That is, the server 100 for improving recognition accuracy of acoustic data of the present invention may be implemented in the form of one or more of the cloud computing services described above. The specific description of the cloud computing services described above is exemplary, and the present invention may include any platform for building a cloud computing environment.

In various embodiments, the server 100 for improving recognition accuracy of acoustic data may be connected to the user terminal 200 through the network and may not only generate and provide the acoustic recognition model that analyzes the acoustic data, but also provide information (e.g., acoustic event information) obtained by analyzing the acoustic data to the user terminal through the acoustic recognition model.

Here, the network may be a connection structure capable of exchanging information between respective nodes such as a plurality of terminals and servers. For example, the network may include a local area network (LAN), a wide area network (WAN), the Internet (World Wide Web (WWW)), a wired/wireless data communication network, a telephone network, a wired/wireless television communication network, or the like.

In addition, here, examples of the wireless data communication network include 3G, 4G, 5G, $3^{rd}$ Generation Partnership Project (3GPP), $5^{th}$ Generation Partnership Project (5GPP), long term evolution (LTE), world interoperability for microwave access (WiMAX), Wi-Fi, Internet, a LAN, a wireless LAN (WLAN), a WAN, a personal area network (PAN), radio frequency, a Bluetooth network, a near-field communication (NFC) network, a satellite broadcast network, an analog broadcast network, a digital multimedia broadcasting (DMB) network, and the like, but are not limited thereto.

In an embodiment, the user terminal 200 may be connected to the server 100 for improving recognition accuracy of acoustic data through the network, provide the acoustic data to the server 100 for improving recognition accuracy of acoustic data, and receive the information related to the occurrence (e.g., the occurrence of alarm sound, child crying sound, glass breaking sound, flat tire sound, or the like) of various events in response to the provided acoustic data.

Here, the user terminal 200 is a wireless communication device that ensures portability and mobility and may include any type among handheld-based wireless communication devices such as a navigation device, a personal communication system (PCS), global system for mobile communication (GSM), a personal digital cellular (PDC) phone, a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal, a smart phone, a smart pad, and a tablet personal computer (PC), but are not limited thereto. For example, the user terminal 200 may be installed in a specific area to perform detection related to the specific area. For example, the user terminal 200 may be provided in a vehicle to acquire the acoustic data generated while a vehicle is parked or driving. The description of the specific location or place where the above-described user terminal is provided is only exemplary, and the present invention is not limited thereto.

In an embodiment, the external server 300 may be connected to the server 100 for improving recognition accuracy of acoustic data through the network, and the server 100 for improving recognition accuracy of acoustic data may provide various types of information/data necessary to analyze the acoustic data using the artificial intelligence model or receive, store, and manage the resulting data derived from the acoustic data analysis using the artificial intelligence model. For example, the external server 300 may be a storage server separately provided outside the server 100 for improving recognition accuracy of acoustic data, but is not limited thereto. Hereinafter, a hardware configuration of the server 100 for improving recognition accuracy of acoustic data will be described with reference to FIG. 2.

Figure 2:
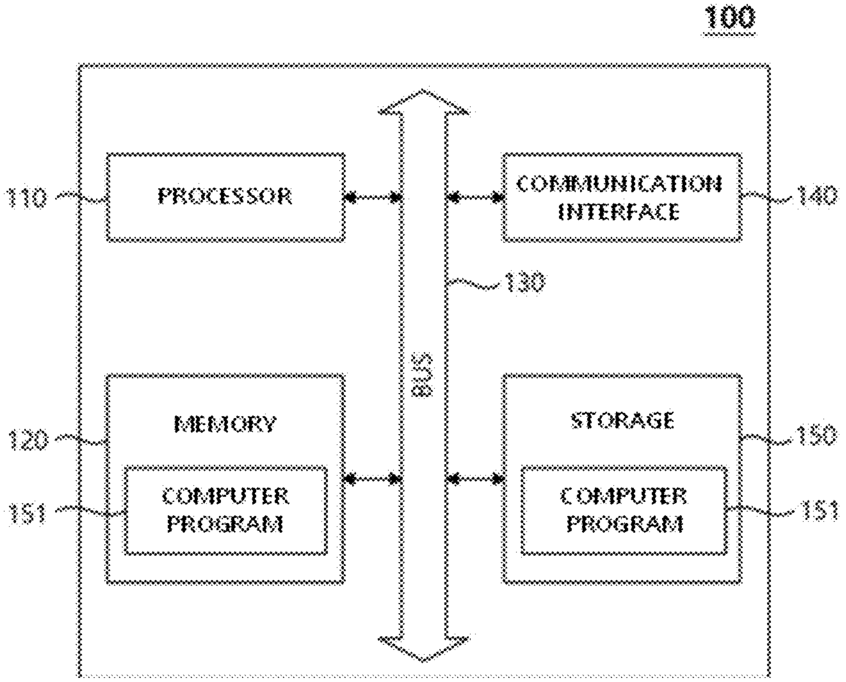
FIG. 2 is a hardware configuration diagram of a server for improving recognition accuracy of acoustic data according to an embodiment of the present invention.

FIG. 2 is a hardware configuration diagram of a server for improving recognition accuracy of acoustic data according to an embodiment of the present invention.

Referring to FIG. 2, the server 100 (hereinafter, "server 100") for providing a platform (hereinafter, computing device) according to the embodiment of the present invention may include one or more processors 110, a memory 120 into which a computer program 151 executed by the processor 110 is loaded, a bus 130, a communication interface 140, and a storage 150 for storing the computer program 151. Here, only the components related to the embodiment of the present invention are illustrated in FIG. 2. Accordingly, those skilled in the art to which the present invention pertains may understand that other general-purpose components other than those illustrated in FIG. 2 may be further included.

The processor 110 controls an overall operation of each component of the server 100. The processor 110 may include a central processing unit (CPU), a microprocessor unit (MPU), a micro controller unit (MCU), a graphics processing unit (GPU), or any type of processor well known in the art of the present invention.

The processor 110 may read the computer program stored in the memory 120 and perform the data processing for the artificial intelligence model according to the embodiment of the present invention. According to an embodiment of the present invention, the processor 110 may perform calculations for training the neural network. The processor 110 may perform calculations for training a neural network, such as processing input data for training in deep learning (DL), extracting features from the input data, calculating errors, and updating weights of the neural network using back-propagation.

In addition, the processor 110 may allow at least one of CPU, a general-purpose GPU (GPGPU), and a tensor processing unit (TPU) to process the training of the network function. For example, both the CPU and GPGPU may process the training of the network function and the data classification using the network function. In addition, in an embodiment of the present invention, processors of a plurality of computing devices may be used together to process training of a network function and data classification using the network function. In addition, a computer program executed in a computing device according to an embodiment of the present invention may be a CPU, GPGPU, or TPU executable program.

In this specification, the network function may be used interchangeably with the artificial neural network or neural network. In this specification, the network function may include one or more neural networks, and in this case, the output of the network function may be an ensemble of the outputs of one or more neural networks.

The processor 110 may read the computer program stored in the memory 120 and provide the acoustic recognition model according to the embodiment of the present invention. According to an embodiment of the present invention, the processor 110 may perform calculations to train the acoustic recognition model.

According to an embodiment of the present invention, the processor 110 may generally process the overall operation of the server 100. The processor 110 may provide or process appropriate information or functions to the user or user terminal by processing signals, data, information, and the like, which are input or output through the above-described components, or by driving an application program stored in the memory 120.

In addition, the processor 110 may perform calculations on at least one application or program for executing the method according to the embodiments of the present invention, and the server 100 may include one or more processors.

In various embodiments, the processor 110 may further include a random access memory (RAM) (not illustrated) and a read-only memory (ROM) for temporarily and/or permanently storing signals (or data) processed in the processor 110. In addition, the processor 110 may be implemented in the form of a system-on-chip (SoC) including one or more of a graphics processing unit, a RAM, and a ROM.

The memory 120 stores various types of data, commands and/or information. The memory 120 may load the computer program 151 from the storage 150 to execute methods/operations according to various embodiments of the present invention. When the computer program 151 is loaded into the memory 120, the processor 110 may perform the method/operation by executing one or more instructions constituting the computer program 151. The memory 120 may be implemented as a volatile memory such as a RAM, but the technical scope of the present invention is not limited thereto.

The bus 130 provides a communication function between the components of the server 100. The bus 130 may be implemented as various types of buses, such as an address bus, a data bus, and a control bus.

The communication interface 140 supports wired/wireless Internet communication of the server 100. In addition, the communication interface 140 may support various communication methods other than the Internet communication. To this end, the communication interface 140 may include a communication module well known in the art of the present invention. In some embodiments, the communication interface 140 may be omitted.

The storage 150 may non-temporarily store the computer program 151. When performing a process for improving recognition accuracy of acoustic data through the server 100, the storage 150 may store various types of information necessary to provide the process for improving recognition accuracy of acoustic data.

The storage 150 may include a nonvolatile memory, such as a ROM, an erasable programmable ROM (EPROM), an electrically EPROM (EEPROM), and a flash memory, a hard disk, a removable disk, or any well-known computer-readable recording medium in the art to which the present invention pertains.

The computer program 151 may include one or more instructions to cause the processor 110 to perform methods/operations according to various embodiments of the present invention when loaded into the memory 120. That is, the processor 110 may perform the method/operation according to various embodiments of the present invention by executing the one or more instructions.

In an embodiment, the computer program 151 may include configuring one or more instructions executing a method of improving recognition accuracy of acoustic data, which includes configuring one or more acoustic frames based on acoustic data, processing each of the one or more acoustic frames as an input of an acoustic recognition model to output predicted values corresponding to each acoustic frame, identifying one or more recognized acoustic frames through threshold analysis based on the predicted values corresponding to each acoustic frame, identifying a converted acoustic frame through time series analysis based on the one or more recognized acoustic frames, and converting the predicted value corresponding to the converted acoustic frame.

Operations of the method or algorithm described with reference to the embodiment of the present invention may be directly implemented in hardware, software modules executed by hardware, or a combination thereof. The software module may reside in a RAM, a ROM, an EPROM, an EEPROM, a flash memory, a hard disk, a removable disk, a compact disc ROM (CD-ROM), or in any form of computer-readable recording media known in the art to which the present invention pertains.

The components of the present invention may be embodied as a program (or application) and stored in media for execution in combination with a computer, which is hardware. The components of the present invention may be executed in software programming or software elements, and similarly, embodiments may be realized in a programming or scripting language such as C, C++, Java, and assembler, including various algorithms implemented in a combination of data structures, processes, routines, or other programming constructions. Functional aspects may be implemented in algorithms executed on one or more processors. Hereinafter, the method of improving recognition accuracy of acoustic data performed by the server 100 will be described with reference to FIGS. 3 to 9.

Figure 3:
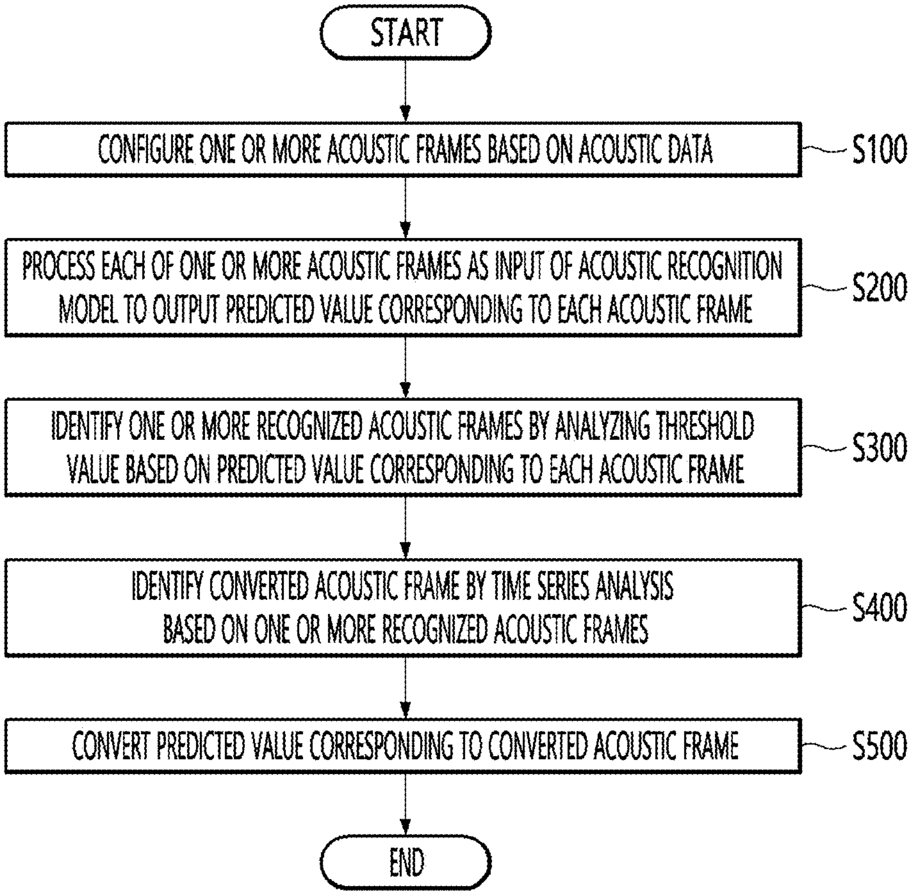
FIG. 3 is an exemplary flowchart illustrating a method of improving recognition accuracy of acoustic data according to an embodiment of the present invention.

FIG. 3 is an exemplary flowchart illustrating the method of improving recognition accuracy of acoustic data according to the embodiment of the present invention. The order of the operations illustrated in FIG. 3 may be changed as needed, and at least one operation may be omitted or added. That is, the following operations are only an example of the present invention, and the scope of the present invention is not limited thereto.

According to an embodiment of the present invention, the server 100 may acquire the acoustic data. The acoustic data may include information related to acoustics acquired in real life. The acquisition of the acoustic data according to an embodiment of the present invention may be made by receiving or loading the acoustic data stored in the memory 120. In addition, the acquisition of the acoustic data may be made by receiving or loading data from another storage medium, another computing device, or a separate processing module within the same computing device based on the wired/wireless communication means.

According to an embodiment, the acoustic data may be acquired through the user terminal 200 related to the user. For example, the user terminal 200 related to the user may include any type of handheld wireless communication device such as a smartphone, a smartpad, and a tablet PC, or an electronic device (e.g., a device capable of receiving acoustic data through a microphone) installed on a specific space (e.g., user's living space), or the like.

According to an embodiment of the present invention, the server 100 may configure one or more acoustic frames based on the acoustic data (S100). One or more acoustic frames may be obtained by dividing the acoustic data, which is the time series information, into a plurality of frames based on a specific time unit. Specifically, the server 100 may configure one or more acoustic frames by dividing the acoustic data to have a size of a predetermined first time unit. For example, when first acoustic data is acoustic data acquired in response to a time of 1 minute, the server 100 may set the first time unit to 2 seconds and divide the first acoustic data to configure 30 acoustic frames. The specific numerical descriptions related to the above-described first time unit and one or more acoustic frames are merely exemplary, and the present invention is not limited thereto.

Figure 4:
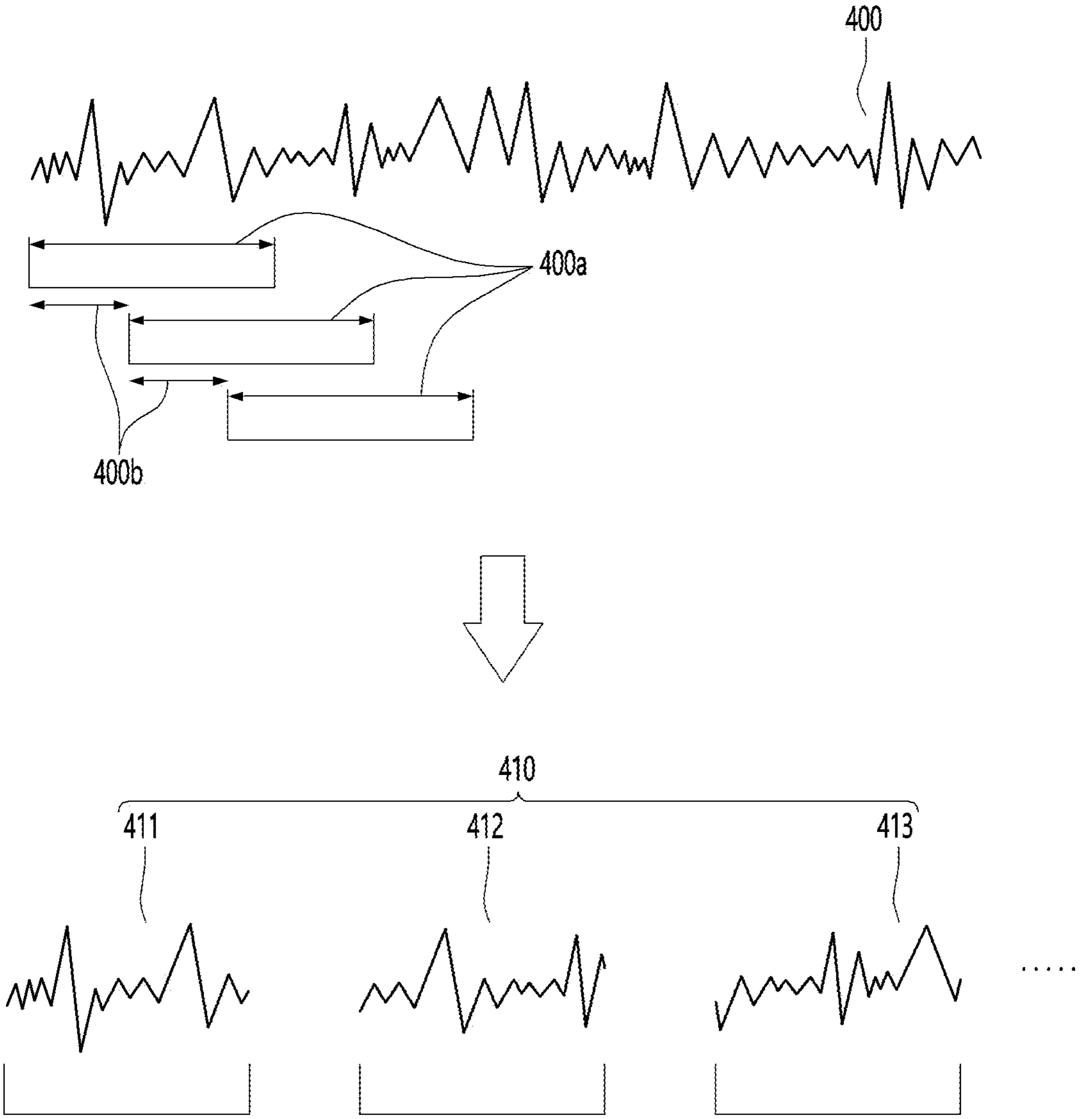
FIG. 4 is an exemplary diagram for describing a process of configuring one or more acoustic frames based on acoustic data according to an embodiment of the present invention.

According to an embodiment, the server 100 may configure one or more acoustic frames so that at least portions of the one or more individual acoustic frames overlap each other. Describing in detail with reference to FIG. 4, a start time of each of one or more acoustic frames may be determined to have a size of a second time unit 400*b* and a start time of each of adjacent acoustic frames. According to an embodiment, the size of the second time unit 400*b* may be determined to be smaller than a size of a first time unit 400*a*. That is, as illustrated in FIG. 4, the server 100 may generate one or more acoustic frames 410 (i.e., a first acoustic frame 411, a second acoustic frame 412, a third acoustic frame 413, etc.) having the same first time unit

400*a*. In this case, each acoustic frame may be different from each adjacent acoustic frame by a size of the second time unit 400*b* that is smaller than a size of the first time unit 400*a*. Accordingly, each acoustic frame may overlap at least a portion of each adjacent acoustic frame.

As a specific example, the acoustic data 400 relates to acoustic acquired for 10 seconds, the first time unit 400*a* may be set to 2 seconds, and the second time unit 400*b* may be set to 1 second smaller than the first time unit 400*a*. In this case, the first acoustic frame 411 may be related to the acoustic acquired for 0 to 2 seconds, the second acoustic frame 412 may be related to the acoustic acquired for 1 to 3 seconds, and the third acoustic frame 413 may be related to acoustic acquired for 2 to 4 seconds. The detailed numerical descriptions related to the total time, the first time unit, and the second time unit, respectively, of the acoustic data described above are only exemplary, and the present invention is not limited thereto.

That is, as one or more acoustic frames are configured so that the start time of each acoustic frame has a size difference between the start time of each of adjacent acoustic frames and the second time unit 400*b* smaller than the size of the first time unit 400*a*, at least a portion of each acoustic frame may have overlapping sections.

According to an embodiment of the present invention, the server 100 may process each of one or more acoustic frames as an input to the acoustic recognition model to output the predicted values corresponding to each acoustic frame (S200).

According to an embodiment, the server 100 may train an autoencoder through an unsupervised learning method. Specifically, the server 100 may train a dimensionality reduction network function (e.g., encoder) and a dimensionality restoration network function (e.g., decoder) that configure the autoencoder to output the output data similar to the input data. In detail, through the dimensionality reduction network function, only core feature data (or features) of the acoustic data input during the encoding process may be trained through the hidden layer and the remaining information may be lost. In this case, during the decoding process through the dimensionality restoration network function, the output data of the hidden layer may be an approximation of the input data (i.e., acoustic data) rather than a perfect copy value. That is, the server 100 may train the autoencoder by adjusting the weights so that the output data and the input data are as similar as possible.

The autoencoder may be a type of neural network to output the output data similar to the input data. The autoencoder may include at least one hidden layer, and an odd number of hidden layers may be disposed between input and output layers. The number of nodes in each layer may be reduced from the number of nodes in the input layer to an intermediate layer indicating a bottleneck layer (encoding), and then also be scaled up and symmetrically scaled down from the bottleneck layer to the output layer (symmetrical to the input layer). The number of input layers and the number of output layers may correspond to the number of items of the input data remaining after the preprocessing of the input data. In an auto-encoder structure, the number of nodes in the hidden layer included in the encoder may have a structure that decreases as the distance from the input layer increases. When the number of nodes in the bottleneck layer (a layer with the fewest nodes located between the encoder and the decoder) is too small, a sufficient amount of information may not be transferred, and therefore, the number of nodes may be maintained at a certain number or more (e.g., more than half of the input layers, etc.).

The server 100 may use a training data set including a plurality of training data each tagged with object information as an input to the trained dimensionality reduction network, and store the results of matching feature data for each output object with the tagged object information. Specifically, the server 100 may use the dimensionality reduction network function to use a first training data subset tagged with first acoustic identification information (e.g., glass breaking sound) as the input to the dimensionality reduction network function, thereby acquiring feature data of the first object for the training data included in the first training data subset. The acquired feature data may be expressed by a vector. In this case, the feature data output in response to each of the plurality of training data included in the first training data subset is output through the training data related to the first acoustic, and therefore, may be located at a relatively close distance in a vector space. The server 100 may store the results of matching the first acoustic identification information (i.e., glass breaking sound) with the feature data related to the first acoustic expressed by the vector.

In the case of the dimensionality reduction network function of the trained autoencoder, the dimensionality restoration network function may be trained to well extract features that enable the input data to be well restored.

Also, for example, a plurality of training data included in each first training data subset tagged with second acoustic identification information (e.g., siren sound) may be converted into feature data (i.e., features) through the dimensionality reduction network function and may display the feature data in the vector space. In this case, the corresponding feature data may be output through the training data related to the second acoustic identification information (i.e., siren sound), and therefore, located at a relatively close distance in the vector space. In this case, the feature data corresponding to the second acoustic identification information may be displayed in the vector space that is different from the feature data corresponding to the first acoustic identification information (e.g., glass breaking sound).

In an embodiment, the server 100 may configure the acoustic recognition model 500 by including the dimensionality reduction network function in the trained autoencoder. In other words, when the acoustic recognition model 500, which includes the dimensionality reduction network function generated through the above training process, receives the acoustic frame as the input, the acoustic recognition model 500 may extract feature information (i.e., features) corresponding to the acoustic frame through the calculations on the acoustic frame using the dimensionality reduction network function.

In this case, the acoustic recognition model 500 may compare the distance in the vector space of the feature data for each object with the area where the feature corresponding to the acoustic frame is displayed to evaluate the similarity of the acoustic styles, and output the predicted value corresponding to the acoustic data based on the similarity evaluation. In an embodiment, the predicted value may include one or more pieces of prediction item information and predicted numerical information corresponding to each of the one or more pieces of prediction item information.

Specifically, the acoustic recognition model 500 may output feature information (i.e., features) by calculating the acoustic frame using the dimensionality reduction network function. In this case, the acoustic recognition model may include one or more pieces of prediction item information corresponding to the acoustic frame and the predicted numerical information corresponding to each piece of prediction item information, based on the location between the feature information output in response to the acoustic frame and the feature data for each piece of acoustic identification information pre-recorded in the vector space through the training.

One or more pieces of prediction item information are information on what kind of sound they are related to, and may include, for example, glass breaking sound, flat tire sound, emergency siren sound, dog barking sound, rain falling sound, etc. Such prediction item information may be generated based on the feature information output in response to the acoustic frame and the acoustic identification information whose location is close in the vector space. For example, the acoustic recognition model may configure one or more pieces of prediction item information through the first feature information output in response to the first acoustic frame and the acoustic identification information matching the feature information located at the close location. The specific description related to one or more pieces of prediction item information described above is only exemplary, and the present invention is not limited thereto.

The predicted numerical information corresponding to each piece of prediction item information may be the information on the predicted numerical value in response to each piece of prediction item information. For example, the acoustic recognition model may configure one or more pieces of prediction item information through the first feature information output in response to the first acoustic frame and the acoustic identification information matching the feature information located at the close location. In this case, the closer the first feature information is to the feature information corresponding to each piece of acoustic identification information, the higher the predicted numerical information may be output, and the farther away the first feature information is from the feature information corresponding to each piece of acoustic identification information, the lower the predicted numerical information may be output.

Figure 5:
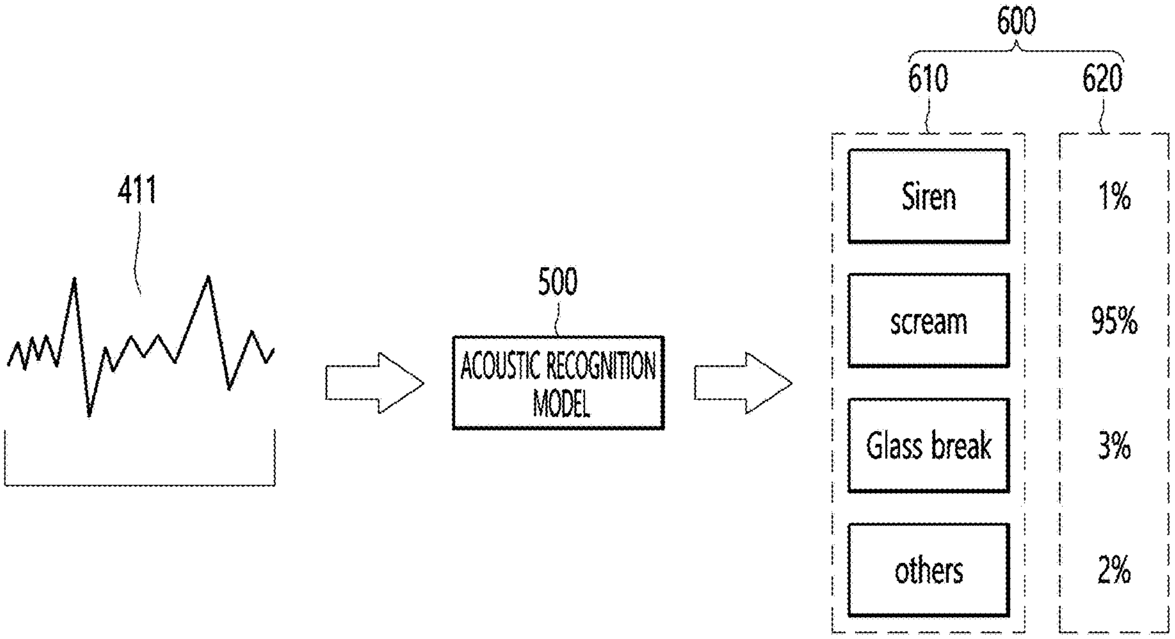
FIG. 5 is an exemplary diagram for describing a process of outputting, by an acoustic recognition model, a predicted value based on an acoustic frame according to an embodiment of the present invention.
Figure 6:
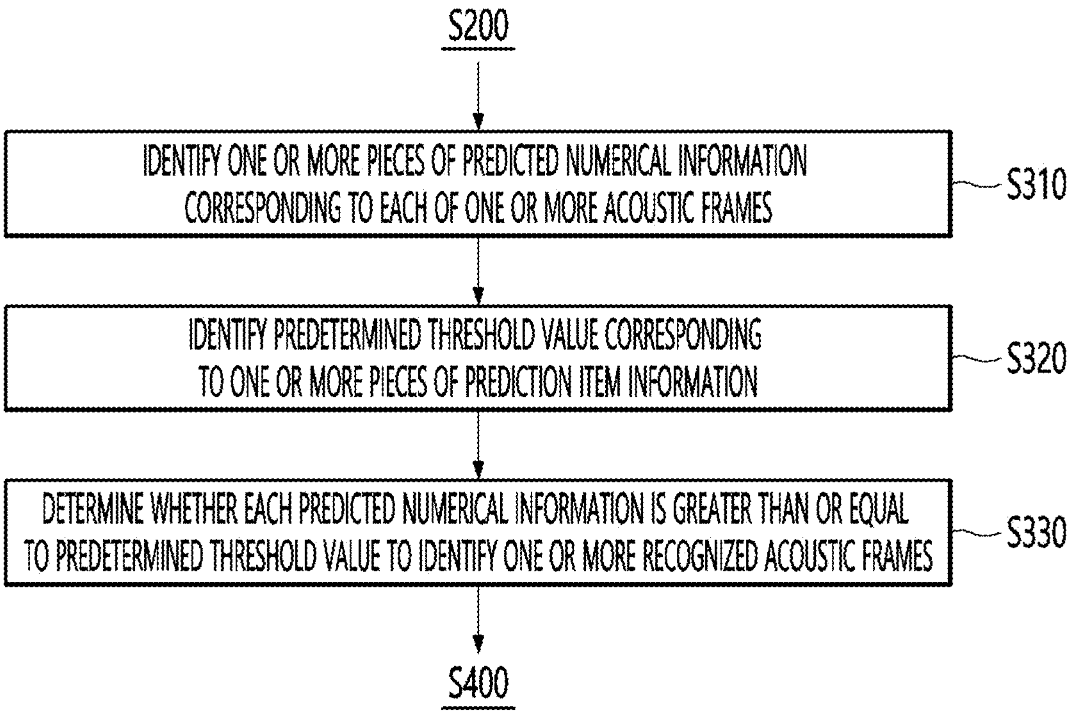
FIG. 6 is an exemplary flowchart illustrating a process of analyzing a threshold value according to an embodiment of the present invention.
Figure 7:
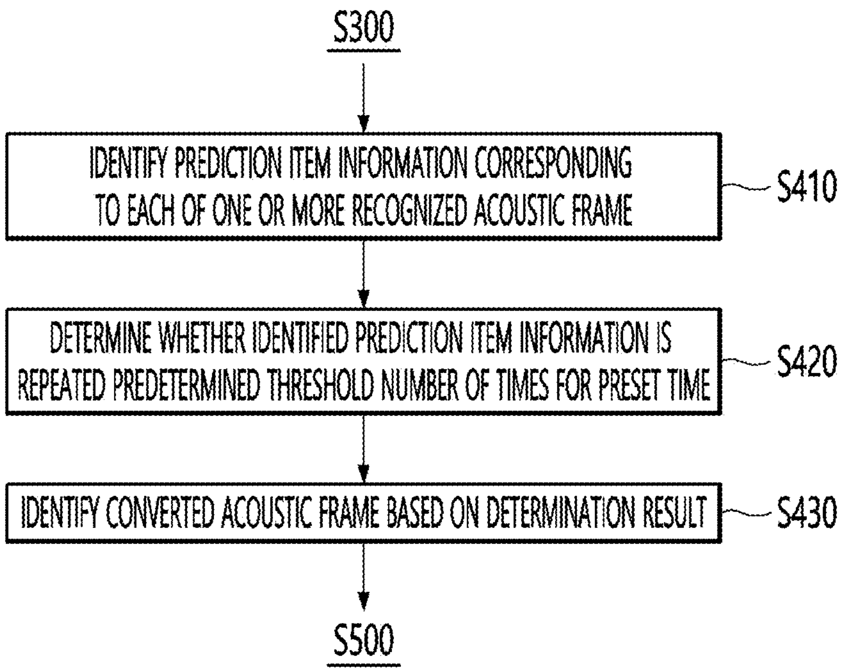
FIG. 7 is an exemplary flowchart illustrating a time series analysis process according to an embodiment of the present invention.

As a specific example, as illustrated in FIG. 5, the acoustic recognition model 500 may output prediction item information 610 related to "siren sound," "screaming sound," "glass breaking sound," and "other sounds" in response to the first acoustic frame 411. In addition, the acoustic recognition model 500 may output predicted numerical information 620 indicating "1," "95," "3," and "2" in response to each piece of prediction item information 610. That is, the acoustic recognition model 500 may output a predicted value 600 indicating that the probability of being related to the siren sound is "1," the probability of being related to the screaming sound is "95," the probability of being related to the breaking glass sound is "3," and the probability of being related to other sounds is "2," in response to the first acoustic frame 411. The description of the specific values for each of the above-described prediction item information and predicted numerical information is only exemplary, and the present invention is not limited thereto.

That is, the server 100 may output a predicted value corresponding to each of one or more acoustic frames configured based on the acoustic data through the acoustic recognition model 500. For example, the acoustic recognition model 500 may output a first predicted value in response to the first acoustic frame 411, a second predicted value in response to the second acoustic frame 412, and output a third predicted value in response to the third acoustic frame 413.

According to an embodiment of the present invention, the server 100 may identify one or more recognized acoustic frames through threshold analysis based on the predicted value in response to each acoustic frame (S300). Here, the threshold analysis may refer to an analysis that identifies the one or more recognized acoustic frames by determining whether each of the one or more pieces of predicted numerical information corresponding to each of the acoustic frames is greater than or equal to a predetermined threshold value in response to each of the prediction item information. A detailed description of the method of identifying one or more recognized acoustic frames through threshold analysis will be described below with reference to FIG. 6.

In an embodiment, the server 100 may identify each of one or more predicted numerical information corresponding to each of one or more acoustic frames (S310). As a specific example, one or more acoustic frames may include a first acoustic frame and a second acoustic frame. The server 100 may process each acoustic frame as an input to the acoustic recognition model 500 and output a predicted value corresponding to each acoustic frame. Here, the predicted value may include one or more pieces of prediction item information and predicted numerical information corresponding to each piece of prediction item information. Accordingly, the server 100 may identify the predicted numerical information corresponding to each acoustic frame through the predicted values output by the acoustic recognition model in response to each acoustic frame.

For example, the server 100 may identify that the predicted numerical information corresponding to the "glass breaking sound" and the "child crying sound" is "82" and "5," respectively, through the predicted value corresponding to the first acoustic frame 411.

In addition, for example, the server 100 may identify that the predicted numerical information corresponding to the "glass breaking sound" and the "child crying sound" is "50" and "12," respectively, through the predicted value in response to the second acoustic frame 412. The detailed numerical description of the above-described predicted numerical information is only exemplary, and the present invention is not limited thereto.

In addition, the server 100 may identify a predetermined threshold value in response to one or more pieces of prediction item information (S320). In an embodiment, the threshold value may be preset in response to each piece of prediction item information. The threshold value may refer to a threshold value for identifying acoustic recognition results with accuracy of a certain level or more. For example, when the predicted numerical information corresponding to the first acoustic frame is greater than or equal to the threshold value, this may mean that the acoustic recognition result of the first acoustic frame is at a reliable level. As another example, when the predicted numerical information corresponding to the second acoustic frame is less than the threshold value, this may mean that the acoustic recognition result of the second acoustic frame lacks some accuracy. The detailed description of each acoustic frame described above is only exemplary, and the present invention is not limited thereto.

The threshold value may be set differently for each prediction item. According to an embodiment, the threshold values for each prediction item may be preset in accordance with the difficulty of the acoustic recognition. For example, the more difficult the acoustic is to recognize, the relatively more difficult the acoustic is to recognize, the lower the threshold value may be set, and the easier the acoustic to recognize, the relatively higher the threshold value may be set. For example, the determination of whether the recognition is easy may be based on the distribution of the feature information included in each piece of acoustic identification information in the vector space. In an embodiment, when the feature information output corresponding to specific acoustic identification information is widely distributed, the recognition may be difficult, and the denser the feature information, the easier recognition may be. That is, the threshold value may be set in response to each of the one or more pieces of prediction item information. As a specific example, the threshold value for the explosion sound that is relatively easy to recognize may be 90, and the threshold value for the child crying sound that is difficult to recognize may be 60. The detailed description of the predetermined threshold value related to each acoustic frame described above is only exemplary, and the present invention is not limited thereto.

The server 100 may identify one or more recognized acoustic frames by determining whether each piece of predicted numerical information is greater than or equal to the predetermined threshold value (S330). Specifically, the server 100 may output the predicted values in response to each acoustic frame. In this case, the predicted values corresponding to each acoustic frame may include the prediction item information and the predicted numerical information.

As a specific example, the server 100 may identify that the predicted numerical information corresponding to the "glass breaking sound" and the "child crying sound" is "82" and "5," respectively, through the predicted value corresponding to the first acoustic frame 411, and identify that the predicted numerical information corresponding to the "glass breaking sound" and the "siren sound" is "50" and "12," respectively, through the predicted value corresponding to the second acoustic frame 412.

In addition, the server 100 may identify the predetermined threshold values for each piece of prediction item information (i.e., the glass breaking sound, the child crying sound, or the siren sound) corresponding to each acoustic frame. For example, the predetermined threshold values corresponding to the glass breaking sound, the child crying sound, and the siren sound may be identified as 80, 60, and 90, respectively.

The server 100 may identify one or more recognized acoustic frames by comparing the predicted numerical information corresponding to each acoustic frame with the threshold values corresponding thereto.

Specifically, the server 100 may identify one or more recognized acoustic frames by determining whether each piece of predicted numerical information included in the output predicted value is greater than or equal to the predetermined threshold value.

In this case, the server 100 may identify that the predicted numerical information corresponding to the glass breaking sound in the first acoustic frame 411 is 82 greater than or equal to 80 which is the predetermined threshold value related to the glass breaking sound, and identify the first acoustic frame 411 as one or more recognized acoustic frames. In addition, the server 100 may identify that the predicted numerical information corresponding to the glass breaking sound in the second acoustic frame 412 is the predetermined threshold value of 50 less than 80 which is the predetermined threshold value related to the glass breaking sound, and identify the second acoustic frame 412 as one or more recognized acoustic frames.

In other words, the server 100 may identify only acoustic frames with the predicted numerical information that is greater than or equal to a predetermined threshold value among one or more acoustic frames configured based on the acoustic data 400 as one or more recognized acoustic frames. That is, the server 100 may remove frames related to recognition results with low accuracy among each acoustic frame and identify only frames with a certain level of reliability or higher as one or more recognized acoustic frames.

According to an embodiment of the present invention, the server 100 may identify the converted acoustic frame through the time series analysis based on one or more recognized acoustic frames (S400). Here, the time series analysis may refer to analysis that determines whether misrecognized acoustic exists by observing the time when the acoustic data is acquired. A detailed description of the method of identifying one or more converted acoustic frames through the time series analysis will be described below with reference to FIG. 7.

In an embodiment, the server 100 may identify the prediction item information corresponding to each of one or more recognized acoustic frames (S410). That is, the server 100 may identify which acoustic each of the one or more recognized acoustic frames identified as a result of the threshold analysis is related to.

For example, one or more recognized acoustic frames may include a first acoustic frame, a fourth acoustic frame, and a fifth acoustic frame. In this case, the server 100 may identify the prediction item information of each acoustic frame. For example, the prediction item information of the first acoustic frame may include the "glass breaking sound," the prediction item information of the fourth acoustic frame may include the "siren sound," and the prediction item information of the fifth acoustic frame may include the "siren sound." The specific description of one or more recognized acoustic frames and prediction item information described above is only exemplary, and the present invention is not limited thereto.

In an embodiment, the server 100 may determine whether the prediction item information is repeated the predetermined threshold number of times or more during a predetermined reference time (S420). Specifically, the server 100 may preset the reference time and threshold number of times for each piece of prediction item information. For example, in the case of the dog barking sound, the reference time may be preset to the time related to two acoustic frames, and the threshold number of times may be preset to twice. In other words, when one or more recognized acoustic frames are related to the dog barking sound, the server 100 may identify the predetermined reference time and threshold number of times in the corresponding item information (i.e., dog barking sound), and determine whether the dog barking sound has been recognized repeatedly the predetermined threshold number of times during the reference time. That is, the server 100 may determine whether the specific acoustic is continuously recognized as much as the predetermined reference value through one or more recognized acoustic frames.

The server 100 may identify the converted acoustic frame based on the determination result (S430). When the server 100 determines through one or more recognized acoustic frames that the specific acoustic has not been recognized continuously as much as the set reference value (i.e., determined to be repeated a predetermined threshold number of times or more within a predetermined reference time), the server 100 may identify at least one of one or more recognized acoustic frames as the converted acoustic frame. Here, the converted acoustic frame may refer to the acoustic frame that is the conversion target to reduce the probability of misrecognition, that is, to improve the recognition accuracy.

According to an embodiment of the present invention, the server 100 may perform the conversion on the predicted value corresponding to the converted acoustic frame (S500). In an embodiment, the conversion for the predicted value may include at least one of a noise conversion and an acoustic term conversion.

The noise conversion may refer to converting the output of the acoustic recognition model based on the converted acoustic frame into the unrecognized item. In other words, this may refer to converting the output (i.e., a predicted value) of the acoustic recognition model related to the conversion frame into unrecognized items (e.g., others).

The acoustic item conversion may refer to converting the prediction item information related to the converted acoustic frame into the corrected prediction item information. Here, the corrected prediction item information may be determined based on the correlation between the prediction item information.

As a specific example, when the prediction item information related to the converted acoustic frame includes information indicating "hand washing sound," "sound of filling water in toilet," which has a correlation with the hand washing sound, may be determined as the corrected prediction item information. In this case, the server 100 may convert the prediction item information so that the converted acoustic frame related to the hand washing sound is recognized as the sound of filling water in toilet. The specific description of the specific values for each of the above-described prediction item information and predicted numerical information is only exemplary, and the present invention is not limited thereto.

As a result, when the server 100 determines through one or more recognized acoustic frames that the specific acoustic has not been recognized continuously as much as the set reference value (i.e., determined to be repeated a predetermined threshold number of times or more within a predetermined reference time), the server 100 may identify the conversion frame and perform the conversion on the predicted value of the corresponding conversion frame. In this case, the conversion of the predicted value of the conversion frame may refer to converting (i.e. converting into the unrecognized item) the conversion frame so that the conversion frame is not recognized or refer to the conversion frame so that the conversion frame is recognized as a different acoustic that does not cause recognition errors when intending to recognize an event. This conversion may be possible since each of one or more acoustic frames partially overlaps with adjacent acoustic frames. For example, since some overlapping portions are recognized through the second time unit, an acoustic frame that is independently recognized in one acoustic frame may be identified as a conversion frame and converted.

That is, when it is desired to detect an event by targeting a specific acoustic, by correcting (or converting) the acoustic frames related to the misrecognition so that they do not cause the recognition errors, it is possible to improve the recognition accuracy of the voice data.

According to an embodiment of the present invention, the server 100 may identify the correlation between each recognized acoustic frame based on the prediction item information corresponding to each of one or more recognized acoustic frames. For example, one or more recognized acoustic frames may include the first acoustic frame and the second acoustic frame. The first acoustic frame may include prediction item information indicating "toilet flushing sound," and the second acoustic frame may include prediction item information indicating "hand washing sound." The server 100 may identify the correlation between each acoustic frame. For example, the server 100 may identify a correlation indicating that the acquisition of the second acoustic frame is predicted after acquiring the first acoustic frame.

In an embodiment, the server 100 may determine whether to adjust the threshold values and the threshold number of times corresponding to each of one or more acoustic frames based on the correlation. The server 100 may adjust the threshold value and the threshold number of times corresponding to the acoustic frame according to the correlation between the acoustic frames. That is, the predetermined threshold values and threshold number of times for each acoustic item may be variably adjusted depending on the correlation between the acoustic frames.

As a more detailed example, the server 100 may be provided to detect the event related to the acoustic of toilet flushing. In this case, the first acoustic frame acquired based on the acoustic data may include the prediction item information indicating the "toilet flushing sound," and the second acoustic frame may include the prediction item information indicating the "hand washing sound." For example, the acoustic related to the second acoustic frame also relates to water flowing sound, and may be similar to the acoustic event (i.e., toilet flushing sound) detected or recognized by the server 100. Accordingly, the server 100 may identify the correlation (that is, correlation that the acquisition of the hand washing sound is predicted after the acquisition of the first acoustic frame) between the acoustic frames and adjust the threshold value and the threshold number of times corresponding to the prediction item related to the hand washing sound.

For example, the server 100 may adjust the threshold value corresponding to the acoustic prediction item related to the hand washing sound from 80 to 95. Accordingly, the threshold value for determining the hand washing sound is improved in the process of analyzing a threshold value, and thus the accuracy of recognition can be further improved. In this case, as the higher standard is set than before, the probability of acoustic frames being recognized as the hand washing sound decreases, the accuracy of the event recognition related to the toilet flushing sound can be improved.

As another example, the server 100 may adjust the threshold number of times corresponding to the acoustic prediction item related to the hand washing sound after the toilet flushing hand from 2 to 5. When the hand washing sound is recognized alone, it may be determined to be properly recognized even when it is continuously recognized only twice, but after the related sound (i.e., toilet flushing sound), it may be determined to be recognized only if it is repeatedly acquired five times.

That is, by variably adjusting the threshold value and the threshold number of times according to the correlation between the acoustics, the acoustic frame acquired at the next time may be processed as the unrecognized item (e.g., others). In other words, when the first acoustic frame is recognized, the threshold value and the threshold number of times related to the second acoustic frame (e.g., hand washing sound) related to the first acoustic frame (e.g., toilet flushing sound) are adjusted to increase the reference value, and then, when the second acoustic frame is acquired, it may be processed to be recognized as the unrecognized item. Accordingly, it is possible to maximize the accuracy of recognition related to the first acoustic frame to be detected.

FIG. 8 shows an exemplary table for describing a process of correcting acoustic data correction process according to an embodiment of the present invention. FIG. 9 shows exemplary diagrams for describing the process of correcting acoustic data according to an embodiment of the present invention.

FIG. 8 may be a table related to the predicted values output by the acoustic recognition model in response to the case where five acoustic frames are configured based on acoustic data. As illustrated in FIG. 8, the five acoustic frames may include a first acoustic frame corresponding to 0 to 1 second, a second acoustic frame corresponding to 0.5 to 1.5 seconds, a third acoustic frame corresponding to 1 to 2 seconds, a fourth acoustic frame corresponding to 1.5 to 2.5 seconds, and a fifth acoustic frame corresponding to 2 to 3 seconds. In this case, the first time unit 400*a* may be 1 second, and the second time unit 400*b* may be 0.5 seconds. As the start time of each of adjacent acoustic frames is different as much as the size of the second time unit (400*b*) which is smaller than the size of the first time unit 400*a*, each acoustic frame may overlap at least a portion of each adjacent acoustic frame.

In addition, the prediction item information corresponding to each acoustic frame and the predicted numerical information corresponding to each piece of prediction item information may be as illustrated in FIG. 8. For example, the predicted numerical information may mean that the closer it is to 1, the higher the predicted probability is, and the closer it is to 0, the lower the predicted probability is. For example, it can be seen that the output of the siren corresponding to 0.5 to 1.5 seconds, that is, the second acoustic frame, is the highest as 0.9. This may mean that the probability that the acoustic acquired between 0.5 and 1.5 seconds is siren is very high.

Figure 9A:
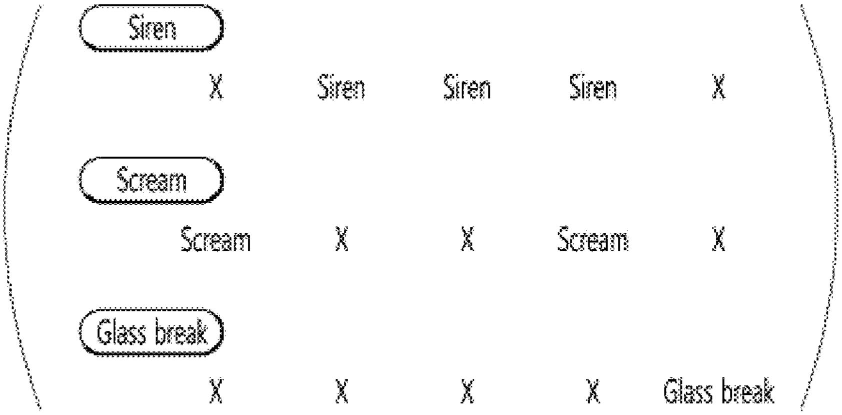
FIG. 9A shows exemplary diagrams for describing the process of correcting acoustic data according to an embodiment of the present invention.

FIG. 9A is an exemplary diagram illustrating the results of the threshold analysis in response to the predicted value in FIG. 8. Referring to FIG. 9A, it can be seen that in the case of the siren, only frames (i.e., the second acoustic frame, the third acoustic frame, and the fourth acoustic frame) that are greater than or equal to the threshold value (e.g., 0.6) are identified. In addition, in the case of the scream, it can be seen that only frames (i.e., the first acoustic frame and the fourth acoustic frame) that are greater than or equal to the threshold value (e.g., 0.3) are identified. In addition, in the case of the glass break, it can be seen that only frames (i.e., the fifth acoustic frame) that are greater than the threshold value (e.g., 0.7) are identified. For example, the acoustic frames that are greater than or equal to the threshold value corresponding to each prediction item may be identified as one or more recognized acoustic frames.

Figure 9B:
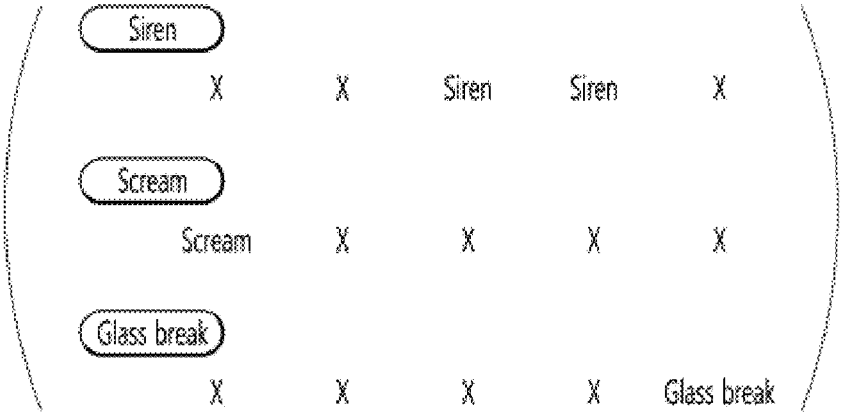
FIG. 9B shows exemplary diagrams for describing the process of correcting acoustic data according to an embodiment of the present invention.

FIG. 9B is an exemplary diagram illustrating the results of the time series analysis in response to the predicted value in FIG. 8. In this case, the predetermined reference time may be preset to the time related to two acoustic frames, and the threshold number of times may be preset twice.

Referring to FIGS. 9A and 9B, in the case of the siren, it can be seen that when the recognition result of the recognized acoustic frame is continuously observed twice, only the related frames remain as the recognition target.

Specifically, in FIG. 9A, it can be confirmed that the second acoustic frame is identified as one or more recognized acoustic frames, but converted in FIG. 9B as a result of the time series analysis. That is, since the first acoustic frame and the second acoustic frame are not continuously observed twice in FIG. 9A as the result of observation, the server 100 may identify the second acoustic frame as the conversion frame and perform the correction to convert the second acoustic frame to others. Accordingly, as illustrated in FIG. 9B, an "x" may be displayed in the second acoustic frame area of the siren. This may indicate that the siren sound is not recognized in the corresponding section. With respect to the subsequent time, since both the second and third acoustic frames have the predicted numerical information greater than or equal to the threshold value, it may be determined that the siren has been recognized in the third acoustic frame. Likewise, for the fourth acoustic frame, since both the third and fourth acoustic frames have the predicted numerical information greater than or equal to the threshold value, it may be determined that the siren has been recognized.

In addition, in the case of the scream, as a result of the threshold analysis, as illustrated in FIG. 9A, it can be confirmed that the scream has been detected in relation to the first acoustic frame and the fourth acoustic frame. However, in the time series analysis process, since the occurrence of the scream is not continuously observed twice in both the third acoustic frame and the fourth acoustic frame, the server 100 may identify the fourth acoustic frame as the conversion frame and perform correction to convert the fourth acoustic frame to others. Accordingly, as illustrated in FIG. 9B, an "x" may be displayed in the fourth acoustic frame area of the scream. This may indicate that the siren sound is not recognized in the corresponding section.

In an additional embodiment, the server 100 may provide information on the recognition result of all the acoustic data to the user terminal 200. That is, the information on the recognition result of the entire acoustic data may include information on which sound is recognized at each time (e.g., each acoustic frame) corresponding to the entire acoustic data acquired in time series. For example, the information on the recognition result of the entire acoustic data may be as illustrated in FIG. 9C.

Figure 9C:
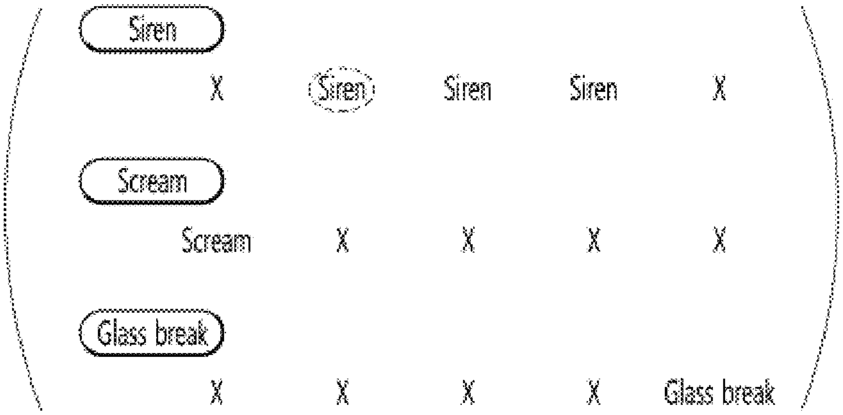
FIG. 9C shows exemplary diagrams for describing the process of correcting acoustic data according to an embodiment of the present invention.

Referring to FIG. 9C, the information that the siren has been recognized may be displayed in relation to the second acoustic frame. In this case, as illustrated in FIG. 9B, the second acoustic frame related to the siren may be converted (or corrected) since the siren sound is not recognized in the time series analysis process. In an embodiment, when providing the information on the recognition results of all the acoustic data, the server 100 may again restore results that exceed the threshold value but are excluded from the time series analysis process. In the acoustic recognition process, it should be continuously recognized twice or more to be used as the recognition target, but in the case where the entire recognition information is provided, it may be intended to reflect the corresponding recognition result.

Operations of the method or algorithm described with reference to the embodiment of the present invention may be directly implemented in hardware, in software modules executed by hardware, or in a combination thereof. The software module may reside in a RAM, a ROM, an EPROM, an EEPROM, a flash memory, a hard disk, a removable disk, a CD-ROM, or in any form of computer-readable recording media known in the art to which the present invention pertains.

The components of the present invention may be embodied as a program (or application) and stored in media for execution in combination with a computer which is hardware. The components of the present invention may be executed in software programming or software elements, and similarly, embodiments may be realized in a programming or scripting language such as C, C++, Java, and assembler, including various algorithms implemented in a combination of data structures, processes, routines, or other programming constructions. Functional aspects may be implemented in algorithms executed on one or more processors.

According to various embodiments of the present invention, it is possible to improve recognition accuracy of acoustic data through correction for acoustic data.

The effects of the present invention are not limited to the above-described effects, and other effects that are not described may be obviously understood by those skilled in the art from the following description.

Although exemplary embodiments of the present invention have been described with reference to the accompanying drawings, those skilled in the art to which the present invention belongs will appreciate that various modifications and alterations may be made without departing from the spirit or essential feature of the present invention. Therefore, it is to be understood that embodiments described above are illustrative rather than being restrictive in all aspects.

What is claimed is:

1. A method of improving recognition accuracy of acoustic data, which is performed by one or more processors of a computing device, the method comprising:

configuring one or more acoustic frames based on acoustic data;

processing each of the one or more acoustic frames as an input of an acoustic recognition model to output predicted values corresponding to each acoustic frame;

identifying one or more recognized acoustic frames through threshold analysis based on the predicted values corresponding to each acoustic frame;

identifying a converted acoustic frame through time series analysis based on the one or more recognized acoustic frames;

converting a predicted value corresponding to the converted acoustic frame, wherein the predicted value includes one or more pieces of prediction item information and predicted numerical information corresponding to each of the one or more pieces of prediction item information, wherein the threshold analysis is an analysis that identifies the one or more recognized acoustic frames by determining whether each of the one or more pieces of predicted numerical information corresponding to each of the acoustic frames is greater than or equal to a predetermined threshold value corresponding to each of the prediction item information, and wherein the identifying of the converted acoustic frame through the time series analysis includes:

identifying prediction item information corresponding to each of the one or more recognized acoustic frames;

determining whether the identified prediction item information is repeated a predetermined threshold number of times or more for a predetermined reference time; and identifying the converted acoustic frame based on the determination result;

identifying a correlation between each recognized acoustic frame based on the prediction item information corresponding to each of one or more recognized acoustic frames; and determining whether to adjust the threshold values and the threshold number of times corresponding to each of the one or more acoustic frames based on the correlation.

2. The method of claim 1, wherein the configuring of the one or more acoustic frames based on the acoustic data includes configuring the one or more acoustic frames by dividing the acoustic data to have a size of a preset first time unit.

3. The method of claim 2, wherein a start time of each of the one or more acoustic frames is determined to have a size difference of a second time unit from a start time of each of adjacent acoustic frames.

4. The method of claim 1, wherein the conversion for the predicted value includes at least one of a noise conversion that converts an output of the acoustic recognition model based on the converted acoustic frame into a non-recognition item, and an acoustic item conversion that converts prediction item information related to the converted acoustic frame into corrected prediction item information.

5. The method of claim 4, wherein the corrected prediction item information is determined based on a correlation between the prediction item information.

6. An apparatus for performing a method of improving recognition accuracy of acoustic data, comprising:

a memory configured to store one or more instructions; and a processor configured to execute the one or more instructions stored in the memory, wherein the processor performs the method of claim 1 by executing the one or more instructions.

7. A non-transitory computer-readable recording medium on which a program for executing a method of improving recognition accuracy of acoustic data with a computing device is recorded, wherein the method comprises:

configuring one or more acoustic frames based on acoustic data;

processing each of the one or more acoustic frames as an input of an acoustic recognition model to output predicted values corresponding to each acoustic frame;

identifying one or more recognized acoustic frames through threshold analysis based on the predicted values corresponding to each acoustic frame;

identifying a converted acoustic frame through time series analysis based on the one or more recognized acoustic frames; and converting a predicted value corresponding to the converted acoustic frame, wherein the predicted value includes one or more pieces of prediction item information and predicted numerical information corresponding to each of the one or more pieces of prediction item information, wherein the threshold analysis is an analysis that identifies the one or more recognized acoustic frames by determining whether each of the one or more pieces of predicted numerical information corresponding to each of the acoustic frames is greater than or equal to a predetermined threshold value corresponding to each of the prediction item information, and wherein the identifying of the converted acoustic frame through the time series analysis includes:

identifying prediction item information corresponding to each of the one or more recognized acoustic frames;

determining whether the identified prediction item information is repeated a predetermined threshold number of times or more for a predetermined reference time; and identifying the converted acoustic frame based on the determination result;

identifying a correlation between each recognized acoustic frame based on the prediction item information corresponding to each of one or more recognized acoustic frames; and determining whether to adjust the threshold values and the threshold number of times corresponding to each of the one or more acoustic frames based on the correlation.

* * * * *